United States Patent [19]
Gustafson et al.

[11] Patent Number: 6,029,761
[45] Date of Patent: Feb. 29, 2000

[54] SUPPLEMENTAL STEERING CONTROL FOR A DIFFERENTIAL STEER MACHINE

[75] Inventors: Alan D. Gustafson, Leland; Robert D. Toms, Sycamore, both of Ill.

[73] Assignee: Caterpillar Inc., Peoria, Ill.

[21] Appl. No.: 09/093,203

[22] Filed: Jun. 8, 1998

Related U.S. Application Data

[60] Provisional application No. 60/050,255, Jun. 19, 1997.

[51] Int. Cl.$^7$ ..................................... B62D 6/00
[52] U.S. Cl. ............................................. 180/6.2
[58] Field of Search ................... 180/6.3, 6.32, 180/6.34, 6.36, 6.38, 6.4, 405

[56] References Cited

U.S. PATENT DOCUMENTS

| | | | |
|---|---|---|---|
| 3,461,744 | 8/1969 | Booth | 180/6.2 |
| 3,877,537 | 4/1975 | Ohms et al. | 180/6.3 |
| 4,142,842 | 3/1979 | Hicks et al. | 417/288 |
| 4,505,168 | 3/1985 | Booth et al. | 74/687 |
| 4,700,794 | 10/1987 | Bernhagen | 180/6.44 |
| 4,949,823 | 8/1990 | Coutant et al. | 192/4 C |
| 5,248,020 | 9/1993 | Kreitzberg | 180/244 |
| 5,325,933 | 7/1994 | Matsushita | 180/6.7 |
| 5,857,532 | 1/1999 | Satzler | 180/6.2 |

*Primary Examiner*—Kevin Hurley
*Assistant Examiner*—Andrew J. Fischer
*Attorney, Agent, or Firm*—J. W. Burrows

[57] ABSTRACT

A supplemental steering control is provided for use in a machine that is normally steered by a differential steer mechanism. A second source of pressurized fluid and an independently controlled brake actuator mechanism function to control steering in the event a first source of pressurized fluid fails. By interconnecting the fluid ports of a fluid actuated steer motor when the first source of pressurized fluid fails, the fluid actuated motor is permitted to freely rotate. A single steering control valve is used to control steering during normal use and also during supplemental steering. The independently controlled brake actuator mechanism is connected to the steering control valve and acts to selectively direct pressurized fluid from the second source of pressurized fluid to respective ones of first and second fluid actuated brake mechanisms. Since the fluid operated steer motor is free to rotate, braking of one of the output drives slows its rotation relative to the other output drive thus causing the machine to turn in the desired direction. The subject supplemental steering control uses a common steering control valve and permits the use of existing service/parking brakes to provide the needed steering of the machine in the event the first source of pressurized fluid fails.

10 Claims, 1 Drawing Sheet

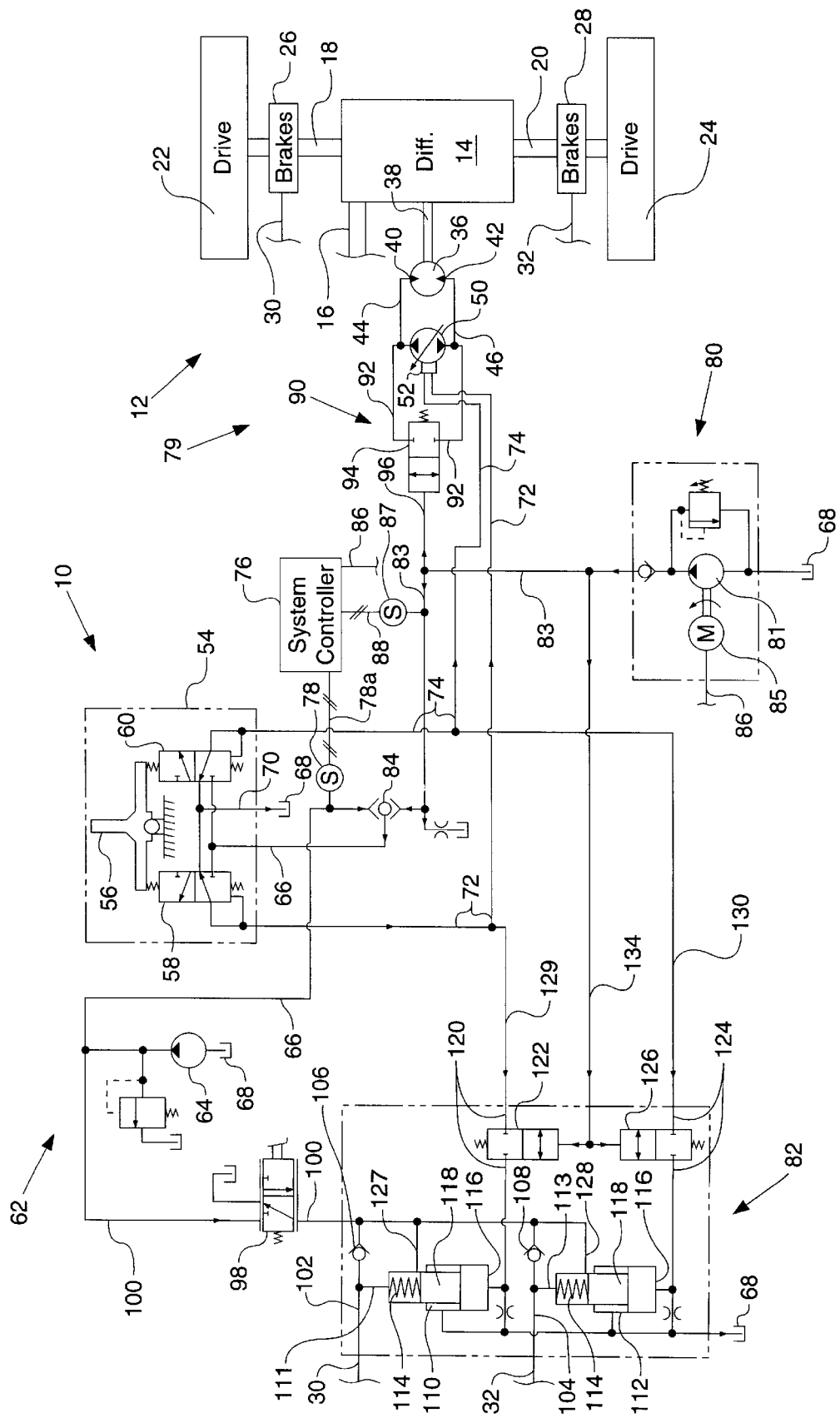

6,029,761

SUPPLEMENTAL STEERING CONTROL FOR A DIFFERENTIAL STEER MACHINE

This application claims the benefit of prior provisional patent application Ser. No. 60/050255 filed Jun. 19, 1997.

TECHNICAL FIELD

This invention relates generally to a supplemental steering control and more specifically to a supplemental steering control for a machine that has a differential steer mechanism to control steering of the machine.

BACKGROUND ART

There are many types of supplemental steering controls known in the art. Many of the known supplemental steering controls use a pressure storage device such as an accumulator to store pressurized fluid that can be used to provide pressurized fluid for steering in the event the main steering control fails. In other steering systems, a steering control valve having a HMU (hand metering unit) is used during emergency conditions. In these systems, the HMU is used to provide pressurized fluid to steer the machine in the event, the main steering pump flow is lost.

In other steering control systems, a differential steer mechanism is used to provide the steering of the machine. In many of these differential steering units, individual steer motors are connected to the differential steer mechanism and operate to either increase or decrease the speed of the respective outputs that provides the driving force to the machine. By increasing or decreasing the speed of one of the outputs relative to the other output, the machine turns in the direction of the slowest output speed. In differential steered machines, each of the outputs are always under a continuous driving force, even when the machine is being steered. By using two different steering motors connected to the respective outputs, during an emergency steering control it is possible to provide stored pressurized fluid to one or the other of the steering motors to steer the machine. Since fluid motors normally require a volume of pressurized fluid to provide the force on a continuous basis to provide the needed differential between the two outputs, it is many times not practical to try to store the needed pressurized fluid.

In other differential steer machines, a single fluid motor is connected to the differential steer mechanism. In these differential steer mechanisms, the single steer motor provides an input into the differential steer mechanism to increase the speed of one of the outputs and simultaneously decrease the speed of the other of the outputs. When the single steer motor is not receiving pressurized fluid to cause rotation of its output, the drive outputs from the differential steer mechanism are mechanically locked together by the non-rotating fluid motor. As noted above with respect to the differential steer mechanisms having two steering motors, it is not practical to use accumulators for storage of pressurized fluid for emergency steering since the volume of pressurized fluid needed for a longer duration of emergency steering is too large.

It has also been known to provide a complete redundant emergency steering control but these systems are normally cost prohibitive. In machines not having differential steering mechanisms, it is well known to use brakes on the drive outputs to individually slow one output relative to the other in order to steer the machine. In these machines, when the one drive output is braked, the power is transferred across a standard differential to the other drive output.

In machines having differential steer mechanisms with only one steering motor, attempting to brake one output is not successful since both outputs are under a continuous driving force. Consequently, the machine will not respond to attempts to steer by braking since the non-rotating fluid motor has the two outputs locked together. In these differential steered machines, even attempts to install larger brakes of very high capacity will not provide adequate steering by braking. Even if it did provide some steer control, the size of the brakes would be cost prohibitive.

The present invention is directed to overcoming one or more of the problems as set forth above.

DISCLOSURE OF THE INVENTION

In one aspect of the present invention, a supplemental steering control is provided and adapted for use in a machine having a first source of pressurized fluid fluidly connected to a steering control valve and to a fluid operated motor by first and second fluid ports. The machine also has a differential steer mechanism mechanically connected to the fluid operated motor, first and second drive outputs operatively connected to the differential steer mechanism, and first and second fluid actuated brake mechanisms associated with the respective first and second drive outputs. The brake mechanisms are selectively operable to reduce the rotational speed of the respective associated one of the drive outputs. A brake valve is connected between the first source of pressurized fluid and the first and second fluid actuated brake mechanisms. The relative speeds between the first and second drive outputs being varied in response to operation of the fluid operated steer motor. The supplemental steering control includes a second source of pressurized fluid operatively connected to the steering control valve and selectively operable to direct pressurized fluid to the steering control valve. A system control is provided and operative to sense the operating pressures of the first and second sources of pressurized fluid and the steering control valve and operable to initiate operation of the second source of pressurized fluid in the event the pressure from the first source of pressurized fluid drops below a predetermined value. An independently controlled brake actuator mechanism is disposed between the first and second fluid actuated brake mechanisms and the brake valve and fluidly connected to the steering control valve, the independently controlled brake actuator being selectively operative in response to the steering control valve to engage the appropriate one of the first and second brakes in the event the pressure from the first source of pressurized fluid drops below the predetermined value. A shunt arrangement is connected between the first and second fluid ports of the fluid operated motor and operative to fluidly interconnect the first and second fluid ports of the fluid operated motor in response to pressurized fluid from the second source of pressurized fluid being above a predetermined level.

BRIEF DESCRIPTION OF THE DRAWINGS

The sole drawing is a partial diagrammatic and a partial schematic representation of an embodiment of a supplemental steering control for a differentially steered machine incorporating the subject invention.

BEST MODE FOR CARRYING OUT THE INVENTION

Referring to the drawing, a steering control system 10 is provided for controlling the steering of a machine 12 (partially shown) and includes a differential steer mechanism 14 having an input power shaft 16 which directs motive power from an engine into the differential steer mechanism 14. First and second drive outputs 18,20 extend from the differential steer mechanism 14 and are respectively connected to first and second drives 22,24. First and second fluid actuated brake mechanisms 26,28 are connected to the respective first and second drive outputs 18,20 in a conventional manner. The first and second fluid actuated brake mechanisms 26,28 receive pressurized fluid through respective conduits 30,32.

A fluid operated motor 36 is mechanically connected to the differential steer mechanism 14 by a shaft 38. The fluid operated motor 36 has first and second fluid ports 40,42. First and second conduits 44,46 connect the first and second fluid ports 40,42 of the fluid motor 36 to a variable displacement pump 50. A pump controller 52 is provided on the variable displacement pump 50 and operative in response to receipt of a signal through a signal line 74 to control the displacement of the variable displacement pump 50. It is recognized that the signal to the pump controller 52 could be an electrical signal without departing from the essence of the subject invention.

A steering control valve 54 is operatively connected to the variable displacement pump 50 and is operative to control the displacement thereof in response to the degree of steer input. The steering control valve 54 includes an input lever 56, first and second pilot valves 58,60 operatively connected to the input lever 56 to control the flow of pressurized fluid from a first source of pressurized fluid 62, such as a pilot pump 64. It is recognized that the first source of pressurized fluid 62 could be a single source replacing both the variable displacement pump 50 and the pilot pump 64 even though in the subject embodiment the source of pressurized fluid 62 is made up of two separate pumps 50,64. The pilot pump 64 provides pressured fluid to the first and second pilot valves 58,60 in a conventional manner through a conduit 66. Each of the pilot valves 58,60 are connected to a reservoir 68 by a conduit 70 and to the pump controller 52 through respective conduits 72,74. Each of the pilot valves 58,60 is movable between a first position at which the pressurized fluid from the pilot pump 64 is blocked and the respective conduits 72,74 are in open communication with the reservoir 68. Movement of the input lever 56 in one direction moves the associated one of the pilot valves 58,60 towards a second position at which the pressurized fluid from the pilot pump 64 is controllably directed to the associated one of the conduits 72,74 to control the displacement of the variable displacement pump 50 in proportion to the movement of the input lever 56.

A system controller 76 is provided and receives a signal from a first pressure sensor 78 through a signal line 78a. The signal is representative of the pressure level in the conduit 66.

A supplemental steering control 79 is provided and includes the system controller 76, a second source of pressurized fluid 80, such as a pump 81, and an independently controlled brake actuator mechanism 82. The second source of pressurized fluid 80 is operatively connected to the first and second pilot valves 58,60 of the steering control valve 54 by a conduit 83, a resolver valve 84, and a portion of the conduit 66 downstream of the resolver valve 84. The second source of pressurized fluid 80 is selectably driven by an electric motor 85. The electric motor 85 is started and stopped in response to a signal delivered thereto through a signal line 86 that is connected between the electric motor 85 and the system controller 76.

A signal from a second pressure sensor 87 is delivered to the system controller 76 through a signal line 88 and is representative of the pressure level of the fluid from the second source 80 of pressurized fluid in the conduit 83.

A shunt arrangement 90 is connected to the first and second conduits 44,46 and operative to selectively interconnect the first and second fluid ports 40,42 of the fluid operated motor 36. The shunt arrangement 90 includes a conduit 92 connected to the first and second conduits 44,46 and a two position valve 94 disposed therein. The two position valve 94 is spring biased to a flow blocking position and movable to a flow passing position in response to a pressure signal from the second source 80 of pressurized fluid being delivered thereto through a conduit 96 that is connected to the conduit 83.

A service or parking brake valve 98 is connected to the pilot pump 64 by a conduit 100 and selectively operable to direct pressurized fluid therethrough to the first and second fluid actuated brake mechanisms 26,28 through the respective conduits 30,32.

The independently controlled brake actuator mechanism 82 is disposed in the first and second conduits 30,32 downstream of the brake valve 98. The independently controlled brake actuator mechanism 82 includes a first fluid passageway 102 connected between the conduit 30 and the conduit 100 and a second fluid passageway 104 connected between the conduit 32 and the conduit 100. The independently controlled brake actuator mechanism 82 also includes first and second check valves 106,108 disposed in the respective first and second fluid passageways 102,104. A first force multiplier mechanism 110 is operatively connected by a third passageway 111 to the first fluid passageway 102 downstream of the first check valve 106 and a second force multiplier mechanism 112 is connected by a fourth passageway 113 to the second fluid passageway 104 downstream of the second check valve 108. Each of the first and second force multiplier mechanisms 110,112 has a first fluid chamber 114 of a predetermined cross sectional area connected to the respective third and fourth passageways 111,113 and a second fluid chamber 116 of a larger cross sectional area separated by a piston 118. The first and second force multiplier mechanisms 110,112 function to receive a smaller fluid pressure level in the respective second fluid chambers 116 and direct a larger pressure level from the respective first fluid chambers 114.

A fifth fluid passageway 120 is connected to the second fluid chamber 116 of the first force multiplier mechanism 110 and has a first flow blocking valve 122 disposed therein. A sixth fluid passageway 124 is connected to the second fluid chamber 116 of the second force multiplier mechanism 112 and has a second flow blocking valve 126 disposed therein.

A seventh passageway 127 connects to the conduit 100 downstream of the brake valve 98 and to the first fluid chamber 114 of the first force multiplier mechanism 110 generally adjacent the smaller end of the piston 118. An eighth passageway 128 connects to the conduit 100 downstream of the brake valve 98 and to the first fluid chamber 114 of the second force multiplier mechanism 112 generally adjacent the smaller end of the piston 118. When the respective piston 118 moves upwardly, as viewed in the drawing, the piston 118 blocks the communication of the associated seventh and eighth fluid passageways 127,128.

The fifth and sixth fluid passageways 120,124 of the independently controlled brake actuator mechanism 82 are connected to the steering control valve 54 by respective conduits 129,130 and the respective conduits 72,74.

The first and second flow blocking valves 122,126 are each spring biased to a flow blocking position and movable to a flow passing position in response to receipt of pressurized fluid from the second source 80 of pressurized fluid through a conduit 134 connected to the conduit 83.

It is recognized that various forms of the supplemental steering control 79 could be utilized without departing from the essence of the subject invention.

INDUSTRIAL APPLICABILITY

During normal operation of the machine 12 in a straight direction, the motive power delivered to the differential steer mechanism 14 through the shaft 16 is transmitted therethrough to the first and second drive outputs 18,20 and subsequently to the drives 22,24. As long as the fluid operated motor 36 is not operating, the machine 12 continues in a straight path.

If the operator wants to steer the machine 12, he makes a desired steer input to the steer input lever 56. If the steer input lever 56 is moved to the left as viewed in the drawing, the first pilot valve 58 is forced downwardly. As the pilot valve 58 moves downwardly, the pressurized fluid from the pilot pump 64 is directed thereacross and through the conduit 72 to the pump displacement controller 52 of the variable displacement pump 50. As the displacement of the variable displacement pump 50 increases, the fluid operated motor 36 turns in the direction dictated by the path of pressurized fluid from the variable displacement pump 50. The torque from the fluid motor 36 is transmitted to the differential mechanism 14 through the shaft 38. As is well known, the direction and rate of turning of the shaft 38 results in one of the first and second drive outputs 18,20 decreasing in speed and the other one increasing in speed thus causing the machine 12 to steer in the desired direction. During the steering of the machine 12, both of the first and second drive outputs 18,20 remain under motive power. The rate of steer is determined by the degree of steer input made by the operator. If it is desired to steer in the other direction, the operator moves the input lever 56 in the opposite direction.

If it is desirable to use the service/parking brake in a normal manner, the operator actuates the brake valve 98 thus directing pressurized fluid through the respective fluid passageways 127,128, the first fluid chambers 114, the first and second fluid passageways 102,104, and the respective conduits 30,32 to the first and second fluid actuated brake mechanisms 26,28. When the brakes are released, the pressurized fluid flows back to the reservoir 68 through the brake valve 98.

At all times, the system controller 76 is monitoring, through the first and second pressure sensors 78,87, the pressure levels of the fluid from the pilot pump 64 and the second source of pressurized fluid 80. As long as the pressure level in the conduit 66 remains above a predetermined level the electric motor 85 driving the pump 81 remains in the off condition. The predetermined pressure level needed is based on the pressure needed to provide effective turning of the fluid actuated motor 36.

In the event the pressure level in the conduit 66 drops below the predetermined level, the system controller 76 actuates the electric motor 85 thus starting the pump 81 to provide pressurized fluid to effect supplemental steering through use of the steering control valve 54 and the first and second fluid actuated brakes 26,28.

The pressurized fluid from the second source 80 is directed to the steering control valve 54 through the conduit 83, the resolver 84 and a portion of the conduit 66. The desired level of pressure from the second source 80 of pressurized fluid is maintained by the system controller 76 through the use of the second pressure sensor 87. The second pressure sensor 87 is also used to provide a warning signal in the event the electric motor does not start when requested. The system controller 76 starts and stops the electric motor 85 as needed to maintain a desired range of pressure in the conduit 83. It is recognized that the electric motor 85 could be run continuously whenever the pressure in the conduit 66 is below the predetermined level without departing from the essence of the subject invention. If the electric motor 85 is run continuously, the associated relief valve controls the maximum pressure level in the conduit 83.

Simultaneously, the two position blocking valve 94 is moved to its flow passing position in response to receipt of the pressurized fluid signal through the conduit 96 from the second source 80 of pressurized fluid. With the first and second fluid ports 40,42 of the fluid operated motor 36 now interconnected, the fluid operated motor 36 is free to rotate. The pressurized fluid from the second source 80 of pressurized fluid is also directed through the conduit 134 to the first and second blocking valves 122,126 moving them to their flow passing positions.

If a steer input is needed after pressurized flow from the pilot pump 64 has become inefficient or totally absent, the steering can be accomplished by use of the first and second fluid actuated brake mechanisms 26,28. The operator still makes the desired steer input through movement of the input lever 56. If the operator moves the input lever 56 to the left, as viewed in the drawing, the first pilot valves 58 moves downward, as viewed in the drawing. Pressurized fluid from the second source 80 of pressurized fluid is directed thereacross and through the conduits 72,129, the fifth passageway 120, through the now open first blocking valve 122 to the second fluid chamber 116 of the first force multiplier mechanism 110. The pressurized fluid acting on the larger end of the piston 118 moves the piston 118 upward, as viewed in the drawing. The movement of the piston 118 upward forces the fluid from the first fluid chamber 114 into the first fluid passageway 102 and through the conduit 30 to the first fluid actuated brake 26. The check valve 106 prohibits the fluid from flowing towards the brake valve 98. Furthermore, since the end of the piston 118 in the first fluid chamber 114 is smaller than the other end of the piston 118 in the second fluid chamber 116, the pressure level exiting the first fluid chamber 114 is larger than that in the second fluid chamber 116. The degree of force amplification is determined by the difference in cross sectional area between the ends of the piston 118. The greater degree of steer input made by the operator through the input lever 56, the greater the pressure level directed to the first fluid actuated brake mechanism 26.

The pressurized fluid acting on the first fluid actuated brake mechanism 26 slows the rotational speed of the first drive output 18 in relation to the second drive output 20. Since the fluid operated motor 36 is free to rotate, the rotational speeds of the first and second drive outputs 18,20 are free to vary with respect to each other. As the relative speeds of the first and second drive outputs 18,20 vary, the machine turns in the desired direction and at a turn rate generated by the degree of steer input made by the operator through the input lever 56.

If it is desired to steer the machine 12 in the opposite direction, the operator moves the steer input lever 56 to the right, as viewed in the drawing. Pressurized fluid from the second source 80 of pressurized fluid is directed across the second pilot valve 60 through the conduits 74,130, the sixth passageway 124 to the second fluid chamber 116 of the second force multiplier mechanism 112. A higher pressure level of fluid is directed from the first fluid chamber of the second force multiplier 112 to the second fluid actuated brake mechanism 28. The pressurized fluid acting on the second fluid actuated brake mechanism 28 slows the rotational speed of the second drive output 20 relative to the first drive output 18 thus steering the machine in the desired direction at the desired rate of steer.

If the pressure level from the pilot pump 64 is restored, the system controller 76 senses the pressure in the conduit 66 and turns off the electric motor 85 to stop the second source 80 of pressurized fluid. The pressurized fluid in the conduit 83 is permitted to vent to the reservoir 68. At the same time the two position valve 94 moves back to its flow blocking position to disconnect the communication between the first and second fluid ports 40,42 of the fluid operated motor 36. Likewise, the first and second blocking valves 122,126 of the independently controlled brake actuator mechanism 82 move back to their flow blocking positions. The machine 12 is now reset to its original mode of steering.

In view of the foregoing, it is readily apparent that a supplemental steering control 79 is provided that permits use of the service/parking brakes in a differential steered machine to control steering of the machine 12 in the event the first source 62 of pressurized fluid is lost.

Other aspects, objects and advantages of the invention can be obtained from a study of the drawings, the disclosure and the appended claims.

We claim:

1. A system having a steering control valve and a fluid operated motor and adapted for use in a machine, the system comprising:

a first source of pressurized fluid fluidly connected to a steering control valve and to a fluid operated motor by first and second fluid ports;

a differential steer mechanism mechanically connected to the fluid operated motor;

first and second drive outputs operatively connected to the differential steer mechanism;

first and second fluid actuated brake mechanisms associated with the respective first and second drive outputs and being selectively operable to reduce the rotational speed of the respective associated one of the drive outputs a brake valve being connected between the first source of pressurized fluid and the first and second fluid actuated brake mechanisms, the relative speeds between the first and second drive outputs being varied in response to operation of the fluid operated steer motor;

a second source of pressurized fluid operatively connected to the steering control valve and selectively operable to direct pressurized fluid to the steering control valve;

a system controller operative to sense the operating pressures of the first and second sources of pressurized fluid and operable to initiate operation of the second source of pressurized fluid in the event the pressure from the first source of pressurized fluid drops below a predetermined value;

an independently controlled brake actuator mechanism being disposed between the first and second fluid actuated brake mechanisms and the brake valve and fluidly connected to the steering control valve, the independently controlled brake actuator being selectively operative in response to the steering control valve to engage the appropriate one of the first and second brakes in the event the pressure from the first source of pressurized fluid drops below the predetermined value; and a shunt arrangement connected between the first and second fluid ports of the fluid operated motor and being operative to fluidly interconnect the first and second fluid ports of the fluid operated motor in response to pressurized fluid from the second source of pressurized fluid being above a predetermined level.

2. The system of claim 1 wherein the independently controlled brake actuator mechanism includes first and second fluid passageways connecting the first source of pressurized fluid to the respective fluid actuated brake mechanisms, first and second fluid check valves disposed in the respective first and second passageways, and first and second force multiplier mechanisms connected to the respective first and second fluid passageways between the associated check valves and fluid actuated brake mechanisms.

3. The system of claim 2 wherein the first and second force multiplier mechanisms are connected to the steering control valve and selectively operable in response to movement of the steering control valve to pressurize the fluid in the first and second passageways downstream of the first and second check valves.

4. The system of claim 3 wherein the independently controlled brake actuator mechanism includes first and second fluid blocking valves disposed between the steering control valve and the respective first and second force multiplier mechanisms.

5. The system of claim 4 wherein the first and second fluid blocking valves are spring biased to a blocking position and movable to a fluid passing position in response to pressurized fluid from the second source of pressurized fluid.

6. The system of claim 5 wherein the shunt arrangement includes a two position blocking valve disposed in a shunt line connected between the first and second fluid ports of the fluid operated motor.

7. The system of claim 6 wherein the two position blocking valve is spring biased to a flow blocking position and movable to a flow passing position in response to pressurized fluid from the second source of pressurized fluid 8. The system of claim 7 wherein the first source of pressurized fluid includes a pilot pump connected to the steering control valve and a variable displacement pump connected to the first and second fluid ports of the fluid actuated motor through first and second fluid conduits.

9. The system of claim 8 wherein the steering control valve is operative to control the variable displacement pump in proportion to the desired steer input.

10. The system of claim 9 wherein the second source of pressurized fluid includes a pump that is selectively driven by an electric motor.

* * * * *